US012744418B2

(12) United States Patent
Barth et al.

(10) Patent No.: US 12,744,418 B2
(45) Date of Patent: Sep. 22, 2026

(54) STATOR FOR AN ELECTRIC MACHINE OF A MOTOR VEHICLE HAVING A COOLING DUCT IN A LAMINATED CORE

(71) Applicant: Bayerische Motoren Werke Aktiengesellschaft, Munich (DE)

(72) Inventors: Wilfried Barth, Saxen (AT); Peter Davison, St. Ulrich (AT); Thomas Eidenboeck, Hofkirchen (AT); Andreas Wagner, St. Valentin (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 46 days.

(21) Appl. No.: 18/684,892

(22) PCT Filed: Oct. 4, 2022

(86) PCT No.: PCT/EP2022/077512

§ 371 (c)(1),
(2) Date: Feb. 20, 2024

(87) PCT Pub. No.: WO2023/066648

PCT Pub. Date: Apr. 27, 2023

(65) Prior Publication Data

US 2024/0356391 A1 Oct. 24, 2024

(30) Foreign Application Priority Data

Oct. 19, 2021 (DE) ..................... 10 2021 127 034.0

(51) Int. Cl.
*H02K 1/20* (2006.01)
*H02K 9/19* (2006.01)

(52) U.S. Cl.
CPC ................. *H02K 1/20* (2013.01); *H02K 9/19* (2013.01)

(58) Field of Classification Search
None
See application file for complete search history.

(56) References Cited

U.S. PATENT DOCUMENTS 12,184,157 B2 * 12/2024 Vanhee .................... H02K 3/24
2016/0167499 A1 6/2016 Holmes et al.
(Continued)

FOREIGN PATENT DOCUMENTS

DE 10 2013 211 408 A1 12/2014
DE 10 2016 000 985 A1 9/2016
(Continued)

OTHER PUBLICATIONS

International Search Report (PCT/ISA/210) issued in PCT Application No. PCT/EP2022/077512 dated Jan. 30, 2023 with English translation (5 pages).
(Continued)

*Primary Examiner* — Tulsidas C Patel
*Assistant Examiner* — S. Mikailoff
(74) *Attorney, Agent, or Firm* — Crowell & Moring LLP

(57) ABSTRACT

A stator for an electric machine of a motor vehicle includes with a laminated core in which at least one cooling channel runs, through which a cooling fluid for cooling the stator can flow, and at least one winding which is held on the laminated core and has a winding head. At least one ring is provided which adjoins a laminated core at least partially in the axial direction of the stator, has at least one guide channel which is connected fluidically to the cooling channel and through which the cooling fluid from the cooling channel can flow as a result, which guide channel has at least one outlet opening which is directed towards the winding head and via which the cooling fluid which flows through the cooling channel can be discharged from the ring and can be sprayed against the winding head.

8 Claims, 3 Drawing Sheets

(56) References Cited

U.S. PATENT DOCUMENTS

| | | | | |
|---|---|---|---|---|
| 2017/0008554 | A1 | 1/2017 | Hirotani et al. | |
| 2024/0356391 | A1* | 10/2024 | Barth | H02K 1/20 |
| 2025/0096626 | A1* | 3/2025 | Vanhee | H02K 1/20 |

FOREIGN PATENT DOCUMENTS

| | | | |
|---|---|---|---|
| DE | 10 2016 118 815 | A1 | 4/2018 |
| DE | 10 2019 103 971 | A1 | 8/2020 |
| DE | 10 2019 215 402 | A1 | 4/2021 |
| EP | 3 499 685 | A2 | 6/2019 |
| FR | 717 252 | A | 1/1932 |
| JP | 6184531 | B2 | 8/2017 |

OTHER PUBLICATIONS

Resubmission of document C2 filed on Feb. 20, 2024 (German-language Written Opinion (PCT/ISA/237) issued in PCT Application No. PCT/EP2022/077512 dated Jan. 30, 2023 with English translation (12 pages).

Resubmission of document C3 filed on Feb. 20, 2024 (German-language Search Report issued in German Application No. 10 2021 127 034.0 dated Aug. 24, 2022 with partial English translation (11 pages).

Chinese-language Office Action issued in Chinese Application No. 202280053670.2 dated May 15, 2026, with English translation (13 pages).

* cited by examiner

STATOR FOR AN ELECTRIC MACHINE OF A MOTOR VEHICLE HAVING A COOLING DUCT IN A LAMINATED CORE

BACKGROUND AND SUMMARY

The invention relates to a stator for an electric machine of a motor vehicle having a laminated core in which there extends at least one cooling duct that is able to be flowed through by a cooling fluid for cooling the stator, and having at least one winding that is retained on the laminated core and has an end winding. The invention also relates to an electric machine for a motor vehicle.

DE 10 2016 118 815 A1 discloses a cooling arrangement for an electric machine, which has a stator that coaxially surrounds a rotor. In that case, the cooling arrangement has an injection-molded part which has been molded onto the stator and in which a cooling duct for conveying a coolant is formed. JP 6184531 B2 discloses an electric machine. Furthermore, US 2016/0167499 A1 discloses a drive train for a vehicle. Moreover, DE 10 2016 000 985 A1 discloses a method for producing an electric machine.

The object of the present invention is to create a stator for an electric machine of a motor vehicle, and to create an electric machine for a motor vehicle, such that particularly advantageous cooling of the stator can be effected.

This object is achieved by a stator and by an electric machine having the features of the claimed invention.

A first aspect of the invention relates to a stator for an electric machine of a motor vehicle. This means that the motor vehicle, which is preferably in the form of a car, in particular of a passenger car, has, in its fully produced state, the electric machine and can be driven electrically, in particular purely electrically, by way of the electric machine. To this end, the electric machine is preferably in the form of a high-voltage component, the electrical voltage, in particular operating or rated voltage, of which amounts preferably to more than 50 volts, in particular to more than 60 volts and very particularly to several hundred volts. In its fully produced state, the electric machine has the stator and preferably a rotor which is able to be driven by way of the stator and as a result is rotatable about a machine axis of rotation relative to the stator. It is in particular conceivable here for the rotor to be arranged coaxially with the stator. For example, the stator is fixed in a housing of the electric machine and is thus immovable relative to the housing, wherein the housing is formed separately from the stator.

The stator has a laminated core, which is formed for example from a plurality of individual laminations that are formed separately from one another and are connected together. The individual laminations are also referred to as lamination segments, which are arranged one on top of another, for example, in the axial direction of the stator. The axial direction of the stator coincides with the machine axis of rotation and thus with the axial direction of the rotor. The radial direction of the stator coincides with the radial direction of the rotor and extends perpendicularly to the axial direction and thus perpendicularly to the machine axis of rotation. In the laminated core there extends at least one cooling duct that is able to be flowed through by a cooling fluid for cooling the stator. Preferably, the cooling fluid is a liquid, in particular an electrically nonconductive liquid, for example an oil. For example, the cooling fluid may belong to the stator. The feature whereby the stator can be cooled by way of the cooling fluid should be understood in particular as meaning that the cooling fluid is a fluid which can be used as the cooling fluid for cooling the stator, in particular when the cooling fluid exhibits a lower temperature than at least a part of the stator. It is then possible for heat to pass from the part of the stator to the cooling fluid flowing through the stator. It is conceivable for the fluid, i.e. the cooling fluid, to be able to be used to heat at least said part of the stator, in particular when the cooling fluid exhibits a higher temperature than the part. It is then possible for heat to pass from the cooling fluid to the part. Thus, the cooling fluid is usable as a temperature-control fluid for controlling the temperature of the stator, that is to say for cooling and heating the stator.

The stator furthermore has at least one winding which is formed separately from the laminated core and is retained on the laminated core. As a result, the winding is carried by the laminated core. The winding has at least one end winding. The end winding is a subregion of the winding, wherein the subregion, that is to say the winding, protrudes in the axial direction from the laminated core, or, for example, projects beyond the laminated core in the axial direction of the stator. The winding has turns or is formed by turns, wherein the end winding is formed by the turns, such that the turns have their respective reversal or turning points in the end winding, which is also referred to as a winding head. In other words, the winding has first length regions which can extend in particular in an elongated or linear manner in a first direction of extension and, in the process, can extend in particular parallel to one another. Each first length region is assigned a respective second length region of the winding. Furthermore, each first length region and each second length region assigned to the respective first length region is assigned a transitional region which, as seen for example from the first length region to the associated second length region, directly adjoins the first length region and lies ahead of the second length region. In this case, the end winding is formed by the transitional regions. As seen from the respective first length region to the respectively associated second length region via the respective transitional region, the respective second length region assigned to the respective first length region extends in particular linearly or in a filamentary manner in a second direction of extension, which extends in particular obliquely or parallel to the first direction of extension and may, for example, be in the opposite direction to the first direction of extension. The transitional region is thus, so to speak, loop-like or forms a loop.

In order for it now to be possible to effect particularly advantageous cooling, in particular temperature control, of the stator, at least one ring that adjoins the laminated core at least partially, in particular at least predominantly and thus by at least more than half, or completely, and is formed separately from the laminated core is provided according to embodiments of the invention, said ring extending fully, that is to say in a fully closed manner, preferably in the circumferential direction, extending about the axial direction of the stator and thus about the machine axis of rotation, of the stator. In particular, it is conceivable for the ring to be in direct contact with an axial end side of the laminated core.

The ring has at least one guide duct that is fluidically connected to the cooling duct and as a result is able to be flowed through by the cooling fluid from the cooling duct. It is thus possible for the cooling fluid to be fed to the guide duct from the cooling duct. In particular, it is conceivable for the guide duct to be an annular duct, i.e. to be ring-shaped, wherein preferably the guide duct extends annularly in a fully closed manner in the circumferential direction of the stator. The guide duct has at least one outlet opening which is directed toward the end winding and via which the cooling fluid flowing through the guide duct is able to be discharged from the ring and as a result is intended to be sprayed onto the end winding. Via the outlet opening, the guide duct leads to an environment of the stator per se, that is to say considered separately. The feature whereby the outlet opening is directed toward the end winding should be understood in particular as meaning that the cooling fluid flowing through the outlet opening flows from the guide duct onto the end winding, that is to say is sprayed onto or at the end winding. Put yet another way, the cooling fluid flowing through the outlet opening flows along a direction of flow through the outlet opening and thus out of the guide duct, wherein the direction of flow of the cooling fluid flowing through the outlet opening intersects the end winding. The direction of flow of the cooling fluid flowing through the outlet opening coincides with a passage direction of the outlet opening, wherein the cooling fluid can flow through the outlet opening along the passage direction and can thus flow out of the guide duct via the outlet opening. The invention makes it possible, by way of the cooling fluid flowing through the cooling duct, for it to be possible to advantageously cool the laminated core per se. It has been shown to be particularly advantageous here for the cooling duct to be bounded at least partially directly by the laminated core. This means that the cooling fluid flowing through the cooling duct comes into direct contact with the laminated core, with the result that particularly advantageous heat exchange between the cooling fluid flowing through the cooling duct and the laminated core can be effected. Moreover, by way of the invention, the end winding can be cooled particularly effectively.

In an advantageous refinement of the invention, the cooling duct extends in a meandering manner through the laminated core and through the ring, with the result that the cooling duct has a meandering shape arranged partially in the laminated core and partially in the ring. As a result of the meandering shape, at least one deliberate diversion of flow of the cooling fluid flowing through the cooling duct and thus through the meandering shape can be effected, with the result that the stator and, in particular, the laminated core can be cooled particularly effectively.

In order for it to be possible, in particular, to cool the laminated core, in particular to control the temperature of the laminated core, particularly effectively, a further refinement of the invention provides that the cooling duct extends in a meandering manner through the laminated core and through the ring in such a way that a first length region of at least one meander of the meandering shape is able to be flowed through by the cooling fluid in a first direction of flow extending parallel to the axial direction of the stator, and a second length region, adjoining the first length region, of the meander is able to be flowed through by the cooling fluid in a second direction of flow extending parallel to the axial direction of the stator and in the opposite direction to the first direction of flow. In other words, as it passes through the cooling duct and thus through the meandering shape, the cooling fluid flows through the meandering shape in such a way that the cooling fluid first of all flows through the first length region of the meander and in the process flows in the first direction of flow. Thereupon, the cooling fluid flows through the second length region of the meander and in the process in the second direction of flow. As it passes through the meander, the cooling fluid is thus diverted once, in particular exactly once, specifically for example through 180 degrees. As a result, particularly effective and efficient cooling, in particular temperature control, of the stator can be ensured.

In order for it to be possible to effect particularly advantageous heat exchange between the cooling fluid flowing through the cooling duct and the laminated core, a further refinement of the invention provides that the meander having the length regions has a meander head which is arranged in a ring and connects the lengths regions of the meander fluidically together, said meander head being, so to speak, a head of the meander in the same way as the end winding is a head of the winding. If the cooling fluid flows through the meander, the cooling fluid first of all flows through the first length region of the meander, thereupon through the meander head and thereupon through the second length region of the meander, such that the cooling fluid coming from or out of the first length region of the meander is diverted by way of the meander head and in the process is directed to the second length region of the meander and is guided to the second length region of the meander. Provision is preferably made here for the meander head to directly adjoin the first length region of the meander and to be directly ahead of the second length region of the meander, such that, between the meander head and the first length region of the meander and between the meander head and the second length region of the meander, no other, further length region of the meander extends. Since the meander head diverting the cooling fluid coming out of the first length region of the meander to the second length region of the meander is arranged in the ring, the diversion of the cooling fluid coming from the first length region of the meander to the second length region of the meander takes place in the ring. As a result, particularly good flow diversion of the cooling fluid can be effected, and so particularly effective and efficient cooling is able to be produced. In other words, by way of the meander head, the cooling fluid is able to be diverted from the first direction of flow into the second direction of flow.

A further embodiment is characterized in that the ring has at least one supply duct which is able to be flowed through by the cooling fluid and via which the cooling channel is able to be supplied with the cooling fluid. In the direction of flow of the cooling fluid flowing through the supply duct, the cooling duct and the guide duct, the supply duct is thus arranged upstream of the cooling duct, which is arranged upstream of the guide duct. In particular, the supply duct is a central supply duct, via which a plurality of cooling ducts extending in the laminated core can be supplied easily and effectively with the cooling fluid. As a result, particularly good cooling can be produced.

In order for it to be possible to cool the stator, in particular control the temperature of the stator, particularly effectively, a further refinement of the invention provides that the ring is formed from a plastic, i.e. in the form of a plastics ring.

In a further, particularly advantageous embodiment of the invention, the guide duct has a plurality of further outlet openings which are directed toward the end winding and via which the cooling fluid flowing through the guide duct is able to be discharged from the ring and is intended to be sprayed onto the end winding. In this case, the statements made above and below in relation to the first outlet opening are readily transferable to the further outlet openings, as well, and vice versa. Where the following text refers to the outlet openings, unless specified otherwise, this should be understood as meaning both the first outlet opening and the further outlet openings.

It has been found to be particularly advantageous here for the outlet openings to be spaced apart from one another in the circumferential direction, extending about the axial direction of the stator, of the stator and thus of the laminated core. As a result, the end winding can be sprayed with the cooling fluid at a plurality of points, in particular at the same time, with the result that particularly good cooling can be effected.

In order to avoid a situation in which the end winding has excessively hot points, a further refinement of the invention provides that the outlet openings are arranged in an evenly distributed manner in the circumferential direction of the laminated core. This should be understood in particular as meaning that the outlet openings are spaced apart from one another equally in pairs in the circumferential direction of the laminated core and thus of the stator.

Finally, it has been found to be particularly advantageous when at least one length region of the cooling duct is entirely surrounded by the laminated core, in particular is directly bounded by the laminated core, in the circumferential direction of the cooling duct. As a result, particularly advantageous heat exchange between the cooling fluid and the laminated core can be ensured, such that particularly good cooling is able to be produced.

A second aspect of the invention relates to an electric machine for a motor vehicle, having at least one stator according to the first aspect of the invention. Advantages and advantageous refinements of the first aspect of the invention should be considered to be advantages and advantageous refinements of the second aspect of the invention, and vice versa.

Further details of the invention will become apparent from the following description of a preferred exemplary embodiment in conjunction with the associated drawings.

DETAILED DESCRIPTION OF THE DRAWINGS

In the figures, identical or functionally identical elements have been provided with the same reference signs.

Figure 1:
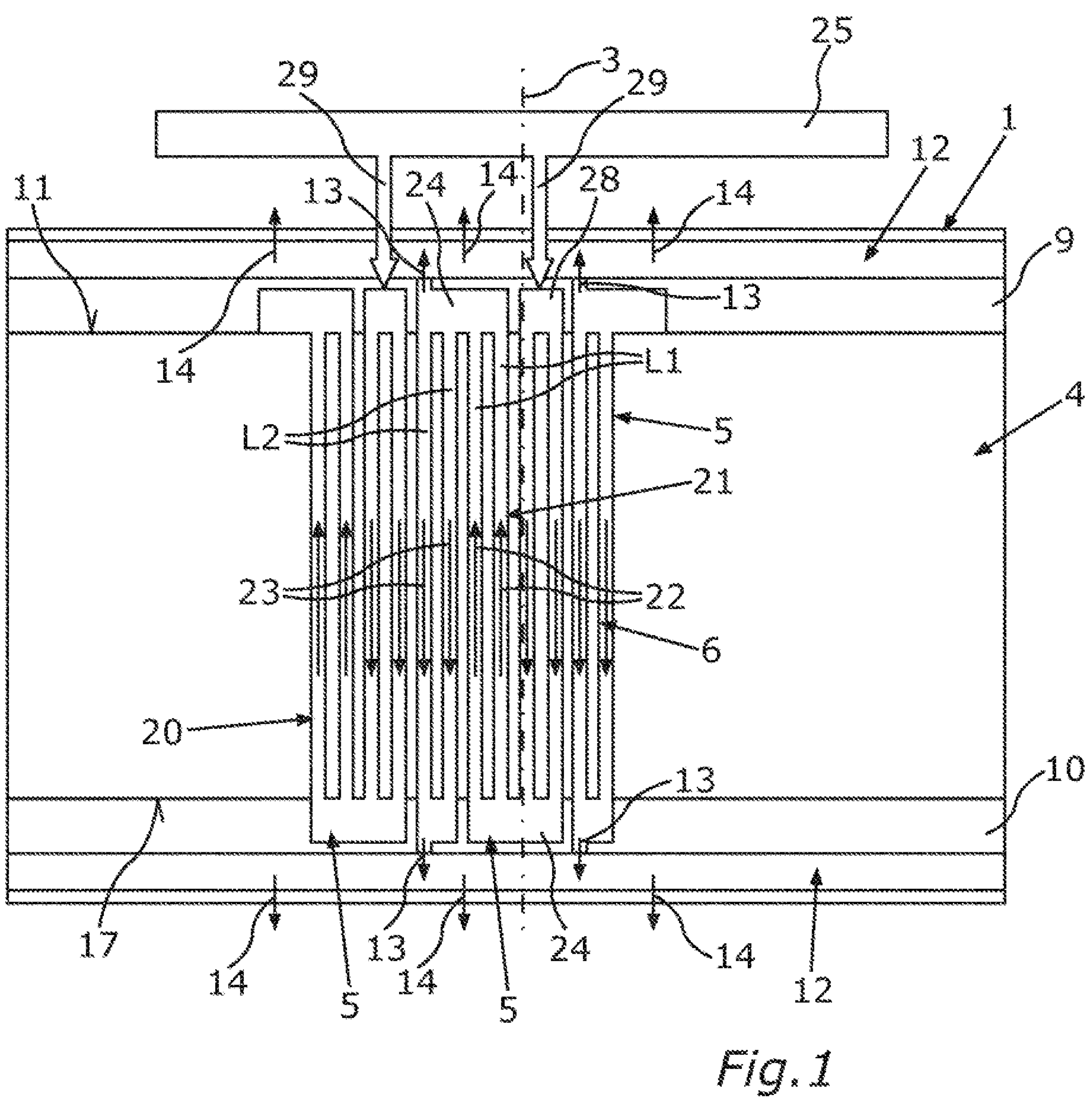
FIG. 1 shows a schematic and developed view of a stator for an electric machine of a motor vehicle.
Figure 2:
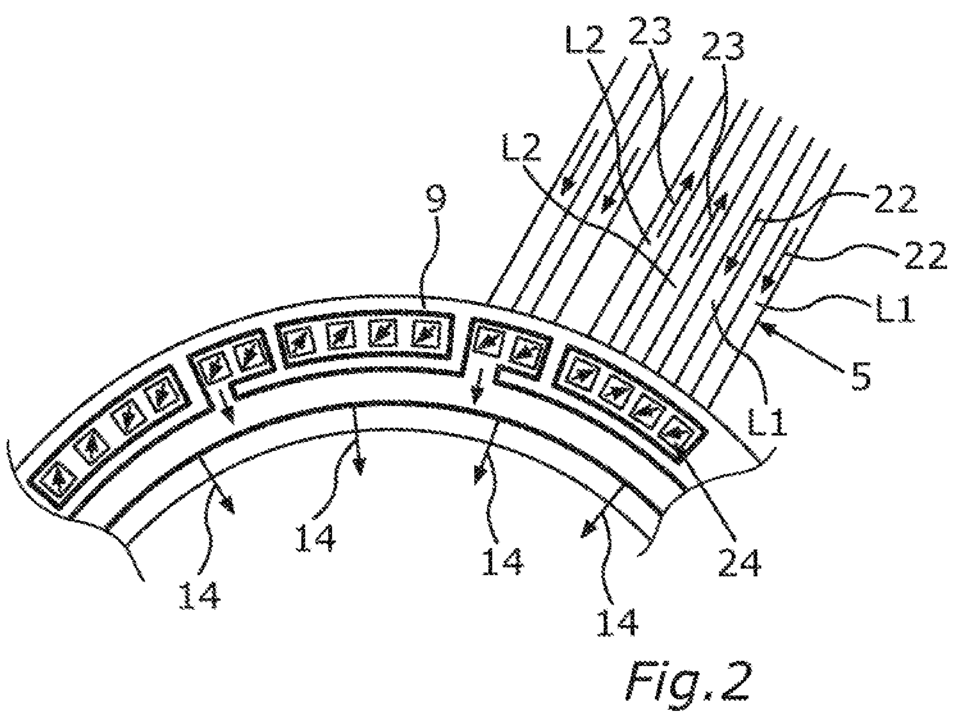
FIG. 2 partially shows a schematic and sectional front view of the stator.

FIG. 1 shows a schematic developed view of a stator 1 for an electric machine of a motor vehicle. In its fully produced state, the motor vehicle, which is preferably in the form of a car, in particular of a passenger car, has the electric machine, by way of which the motor vehicle can be driven electrically, in particular purely electrically. The electric machine has, in its fully produced state, the stator 1 and a rotor 2, which is partially discernible in FIGS. 3 and 4 and which is able to be driven by way of the stator 1 and, as a result, is rotatable about a machine axis of rotation 3 (FIG. 1) relative to the stator 1. The stator 1 is illustrated in a developed view in FIG. 1. In order thus to obtain, for example, a three-dimensional illustration of the stator 1 from FIG. 1, which is illustrated highly schematically in FIG. 1, the stator 1, or FIG. 1, is wrapped around the machine axis of rotation 3, in particular in the manner of a straight circular cylinder. The stator 1, the axial direction of which coincides with the machine axis of rotation 3, has a laminated core 4, which is constructed for example from individual laminations. The individual laminations are also referred to as stator laminations. As is apparent from FIG. 1, cooling ducts 5 extend in the laminated core 4, which, as is indicated by arrows 6, are able to be flowed through by a cooling fluid. Thus, the arrows 6 indicate the cooling fluid flowing through the cooling ducts 5, i.e. a respective flow of the cooling fluid through the respective cooling duct 5. Preferably, the cooling fluid is a liquid cooling fluid, i.e. a cooling liquid. Very preferably, the cooling fluid is an electrically nonconductive cooling fluid. In particular, the cooling fluid is an oil. The feature whereby the cooling fluid is preferably an electrically nonconductive cooling fluid should be understood as meaning that the cooling fluid is preferably a nonconductor, the electrical conductivity of which is less than $10^{-8}$ $S \cdot cm^{-1}$. By way of the cooling fluid, the laminated core 4 and thus the stator 1 can be cooled, in particular by heat transfer from the laminated core 4 to the cooling fluid.

Figure 3:
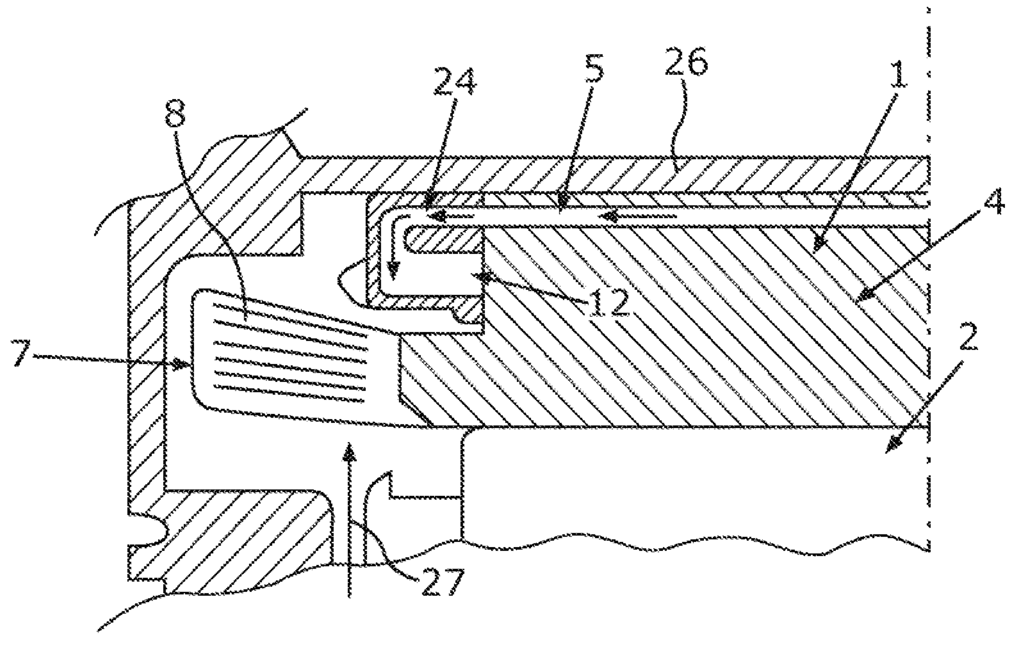
FIG. 3 partially shows a schematic view in longitudinal section of the stator.
Figure 4:
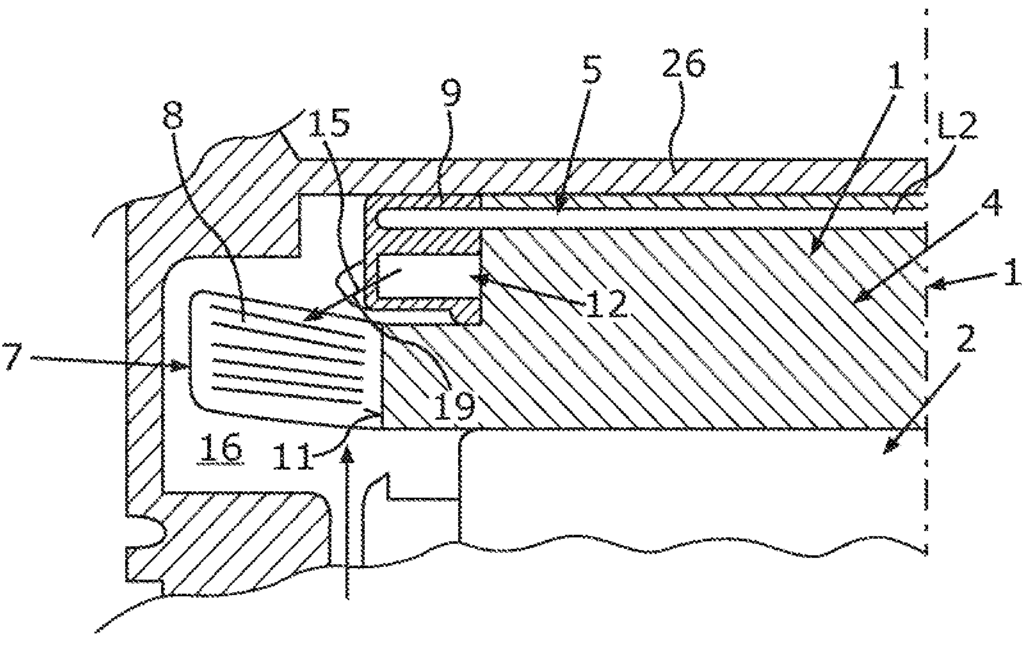
FIG. 4 partially shows a further schematic view in longitudinal section of the stator.

As is apparent from FIGS. 3 and 4, the stator 1 has at least one winding 7, the end winding of which bears the reference 8. The winding 7 is formed by at least one conductor formed for example from a metallic material, through which electric current can flow. The winding 7 is formed separately from the laminated core 4 and retained on the laminated core 4, and thus is carried by the laminated core 4.

In order for it to be possible to effect particularly advantageous cooling of the stator 1, respective rings 9 and 10 (FIG. 1) adjoin the stator 1 and thus the laminated core 4 in the axial direction on both sides of the laminated core 4, such that the laminated core 4 is arranged between the rings 9 and 10 in the axial direction of the stator 1. The rings 9 and 10 are formed separately from the laminated core 4 and preferably also separately from one another. The ring 9 is arranged on a first axial end side 11 of the laminated core 4, and the ring 10 is arranged on a second axial end side 17 of the laminated core 4. The axial end side 17 faces away from the axial end side 4 in the axial direction of the stator 1 and thus of the laminated core 4, and vice versa. In particular, provision is made for the ring 9 to bear directly on the end side 11. Alternatively or additionally, the ring 10 bears directly on the end side 17. It is apparent that the ring 9 adjoins the laminated core 4 at least partially, in particular entirely, in the axial direction of the laminated core 4 and thus of the stator 1. Furthermore, the ring 10 adjoins the laminated core 4 at least partially, in particular entirely, in the axial direction of the stator 1 and thus of the laminated core 4.

The respective rings 9 and 10 have a guide duct 12 which is able to be flowed through by the cooling fluid. It is apparent that the guide ducts 12 of the rings 9 and 10 are fluidically connected to the cooling ducts 5. In the direction of flow of the cooling fluid flowing through the cooling ducts 5 and the guide ducts 12, the guide ducts 12 are arranged downstream of the cooling ducts 5. Thus, as it passes through the cooling ducts 5 and the guide ducts 12, as indicated by arrows 13 in FIG. 1, the cooling fluid flows from the cooling ducts 5 into the guide ducts 12, i.e. out of the cooling ducts 5 and into the guide ducts 12. Thereupon, the cooling fluid flows through the guide ducts 12. Each guide duct 12 is an annular duct, i.e. is ring-shaped. In the exemplary embodiment shown in the figure, the respective rings 9 and 10 extend in a fully closed manner in the circumferential direction, extending about the axial direction of the stator 1, of the stator 1. In this case, provision is also made for each guide duct 12 to extend annularly around in a fully closed manner in the circumferential direction of the stator 1.

As is indicated by arrows 14 in FIG. 1, each guide duct 12 has a plurality of outlet openings 15 (FIG. 4) which are formed in the respective rings 9 and 10 and via which the respective guide duct 12 leads to an environment 16 of the respective rings 9 and 10 per se. Each outlet opening 15 is able to be flowed through by the fluid flowing through the respective guide duct 12, such that the cooling fluid can flow out of the respective guide duct 12 via the respective outlet opening 15 and can thus flow to the environment 16. It is particularly readily apparent from FIG. 4 that the respective outlet opening 15 is directed toward the end winding 8, such that the cooling fluid flowing through the guide duct 12 and the respective outlet opening 15 and thus flowing to the environment 16 and thus flowing out of the guide duct 12 is sprayed onto the end winding 8. This is indicated by an arrow 19 in FIG. 4. It is also apparent from FIG. 4 that the end winding 8, shown in FIGS. 3 and 4, of the winding 7 is arranged on or at the end side 11. In this case, the end winding 8 is able to be supplied with the cooling fluid from the guide duct 12 of the ring 9 via the outlet openings 15 of the ring 9. At or on the end side 17, facing way from the end side 11, of the laminated core 4, the winding 7 has, for example, a second end winding (not visible in the figures), toward which the outlet openings 15 of the guide duct 12 of the ring 10 are directed. Thus, it is possible, for example, for the second end winding to be supplied with the cooling fluid via the outlet openings 15 of the guide duct 12 of the ring 10. As a result, particularly effective and efficient cooling of the stator 1 can be ensured.

It is apparent from FIG. 1 that each cooling duct 5 extends in a meandering manner through the laminated core 4 and the respective rings 9 and 10, such that each cooling duct 5 has a meandering shape 20. In this case, each cooling duct 5 extends in a meandering manner through the laminated core 4 and through the respective rings 9 and 10 in such a way that a respective first length region L1 of a meander 21 of the respective meandering shape 20 of the respective cooling duct 5 is able to be flowed through by the cooling fluid in a first direction of flow, indicated by arrows 22 in FIG. 1, that extends parallel to the axial direction of the stator 1. A respective second length region L2, adjoining the respective first length region L1, of the respective meander 21 of the respective meandering shape 20 of the respective cooling duct 5 is able to be flowed through by the cooling fluid in a second direction of flow that extends parallel to the axial direction of the stator 1, is in the opposite direction to the first direction of flow and is illustrated by arrows 23 in FIG. 1.

The meander 21 thus has the length regions L1 and L2. Moreover, each meander 21 has a respective meander head 24, which is also referred to as diversion space or diversion region. As it passes through the meandering shape 20, the cooling fluid first of all flows through the length region L1 and thereupon out of the length region L1 and into the diversion space (meander head 24). By way of the diversion space (meander head 24), the cooling fluid is diverted out of the length region L1, for example through at least substantially 180 degrees, and guided to the length region L2 and introduced into the length region L2. Thus, the length regions L1 and L2 of the meandering shape 20 are connected fluidically together via the meander head 24, wherein the meander head 24 directly adjoins the length region L1 and lies directly ahead of the length region L2. The meandering shape 20 effects advantageous flow diversion of the cooling fluid flowing through the respective cooling duct 5, such that particularly effective and efficient cooling is able to be produced. It is apparent that the meander head, bearing the reference 24 in FIG. 1, is arranged in the ring 9, such that the meandering shape 20 is arranged partially in the ring 9 and partially in the laminated core 4. Furthermore, the rings 9 and 10 are formed from a plastic and are thus in the form of plastics rings. The meandering shape 20 brings about deliberate flow diversions of the cooling fluid flowing through the cooling duct 5, with the result that particularly advantageous heat exchange between the cooling fluid and the stator 1, in particular advantageous heat transfer from the stator 1 to the cooling fluid, is able to be produced. Furthermore, a supply of the end winding 8 with the cooling fluid via the outlet openings 15 can be ensured. Preferably the outlet openings 15, preferably all of the outlet openings 15, of the respective rings 9 and 10 are arranged in a manner spaced apart from one another and in an evenly distributed manner in the circumferential direction of the stator 1.

In FIG. 1, a preferably central supply duct 25 is discernible, which is able to be flowed through by the cooling fluid. For example, the supply duct 25 and/or the respective cooling duct 5 and/or the guide duct 12 are in the form of a bore. Via the supply duct 25, the cooling ducts 5 are able to be supplied with the cooling fluid, in particular via at least one respective bore, in particular an oil bore. This is indicated by arrows 29 in FIG. 1. In the direction of flow of the cooling fluid flowing through the supply duct 25, the cooling ducts 5 and the guide ducts 12, the supply duct 25 is thus arranged upstream of the cooling ducts 5, which are arranged upstream of the guide ducts 12. In particular, the supply duct is a supply duct which is common to the cooling ducts 5 and via which the or all of the cooling ducts 5 are able to be supplied with the cooling fluid.

It is apparent from FIG. 3 that the electric machine can have a housing 26. The stator 1 is formed separately from the housing 26 and secured to the housing 26. For example, the supply duct 25 extends in the housing 26.

It is apparent from FIG. 3 that, for example by way of the guide duct 12, a flow diversion of the cooling fluid coming from the laminated core 4 and flowing into the outlet opening 15 can be brought about, in particular through at least 90 degrees. As a result of this deliberate flow diversion, particularly advantageous heat exchange can be ensured. In FIGS. 3 and 4, a coolant, or a flow of a coolant, is indicated by an arrow 27, wherein the coolant may be for example a further cooling fluid different than the cooling fluid or may be the same cooling fluid. By way of the coolant, the rotor 2 is cooled. In other words, the coolant is used to cool the rotor 2, the cooling of which is also referred to as rotor cooling. It is apparent that, for example, the end winding 8 can also be supplied with the coolant, in order, as a result, to advantageously cool the end winding 8.

The cooling fluid is fed from the preferably central supply duct 25 into the respective cooling duct 5 for example via at least one or more transfer ducts, distributed for example around the circumference, that is to say in the circumferential direction of the stator 1, in particular through the ring 9, wherein the transfer ducts are in the form, for example, of bores, in particular oil bores. In particular, the cooling fluid is introduced from the supply duct 25, in particular via the respective transfer duct, into an inlet space 28 of the cooling duct 5. From the inlet space 28, the cooling fluid can flow into the meandering shape 20 and consequently flow through the meandering shape 20.

As is apparent from FIG. 1, provision is preferably made for the length regions L1 and L2 of the respective meanders 21 of the meandering shape 20 to extend along the entire lengths, extending in the axial direction of the stator 1, of the laminated core 4, such that, for example, when the laminated core 4 is observed on its own, that is to say when the laminated core 4 is observed without the rings 9 and 10, the length regions L1 and L2 of the respective meanders 21 lead to the environment of the laminated core 4 on both axial end sides 11 and 17 of the latter. Thus, the cooling fluid flows through the laminated core 4 along the entire length, extending in the axial direction, of the laminated core 4. In other words, the cooling fluid flows, both on its path through the length region L1 and on its path through the length region L2, along the entire length, extending in the axial direction of the stator 1, of the laminated core 4. The respective length regions L1 and L2 extend, in the exemplary embodiment shown in FIG. 1, in a straight line and, in the process, parallel to the axial direction of the stator 1.

The outlet openings 15 are spray nozzles, in particular oil spray nozzles, by way of which the cooling fluid is sprayed onto the end winding 8. In particular, it is conceivable for the outlet opening 15 to be in the form of a nozzle, the flow cross section of which, which is able to be flowed through by the cooling fluid, may narrow for example in the direction of the end winding 8, that is to say toward the end winding 8.

LIST OF REFERENCE SIGNS

- 1 Stator
- 2 Rotor
- 3 Machine axis of rotation
- 4 Laminated core
- 5 Cooling duct
- 6 Arrows
- 7 Winding
- 8 End winding
- 9 Ring
- 10 Ring
- 11 Axial end side
- 12 Guide duct
- 13 Arrow
- 14 Arrow
- 15 Outlet opening
- 16 Environment
- 17 Axial end side
- 18 End winding
- 19 Arrow
- 20 Meandering shape
- 21 Meander
- 22 Arrow
- 23 Arrow
- 24 Meander head
- 25 Supply duct
- 26 Housing
- 27 Arrow
- 28 Inlet space
- 29 Arrow
- L1 First length region
- L2 Second length region

The invention claimed is:

1. A stator for an electric machine of a motor vehicle, the stator comprising:

a laminated core in which there extends a cooling duct that is configured to flow a cooling fluid for cooling the stator;

a winding that is retained on the laminated core and has an end winding; and a ring that adjoins the laminated core at least partially in an axial direction of the stator, wherein:

the ring has a guide duct that is fluidically connected to the cooling duct, the guide duct is configured to flow the cooling fluid from the cooling duct, the guide duct has a first outlet opening directed toward the end winding, the first outlet opening is configured to discharge the cooling fluid from the ring and to spray the cooling fluid onto the end winding, the cooling duct has a meandering shape arranged partially in the laminated core and partially in the ring, the meandering shape comprises a meander, a first length region of the meander is configured to flow the cooling fluid in a first direction parallel to the axial direction of the stator, a second length region of the meander is configured to flow the cooling fluid in a second direction parallel to the axial direction of the stator, the second direction is opposite to the first direction, and the second length region adjoins the first length region.

2. The stator as claimed in claim 1, wherein:

the meander has a meander head arranged in the ring, the meander head connects the first length region and the second length region of the meander fluidically together, and the meander head is configured to divert the cooling fluid from the first direction into the second direction.

3. The stator as claimed in claim 1, wherein:

the ring has a supply duct, the supply duct is configured to flow the cooling fluid, and the supply duct is configured to supply the cooling duct with the cooling fluid.

4. The stator as claimed in claim 1, wherein:

the ring is formed from a plastic.

5. The stator as claimed in claim 1, wherein:

the guide duct has a plurality of additional outlet openings directed toward the end winding, the additional outlet openings are configured to discharge the cooling fluid flowing through the guide duct from the ring and to spray the cooling fluid onto the end winding, and the first outlet opening and the additional outlet openings are spaced apart from one another in a circumferential direction of the laminated core.

6. The stator as claimed in claim 5, wherein:

the first outlet opening and the additional outlet openings are arranged in an evenly distributed manner in the circumferential direction of the laminated core.

7. The electric machine of the motor vehicle, the electric machine comprising the stator as claimed in claim 1.

8. The stator as claimed in claim 1, wherein:

a length section of the cooling duct is entirely surrounded by the laminated core in a circumferential direction of the cooling duct, and the length section of the cooling duct is directly bounded by the laminated core.

* * * * *